Jan. 23, 1923.
E. R. STODDARD.
DIE FOR FORMING VEHICLE BODIES.
FILED JUNE 29, 1920.
1,442,913.
5 SHEETS—SHEET 1.
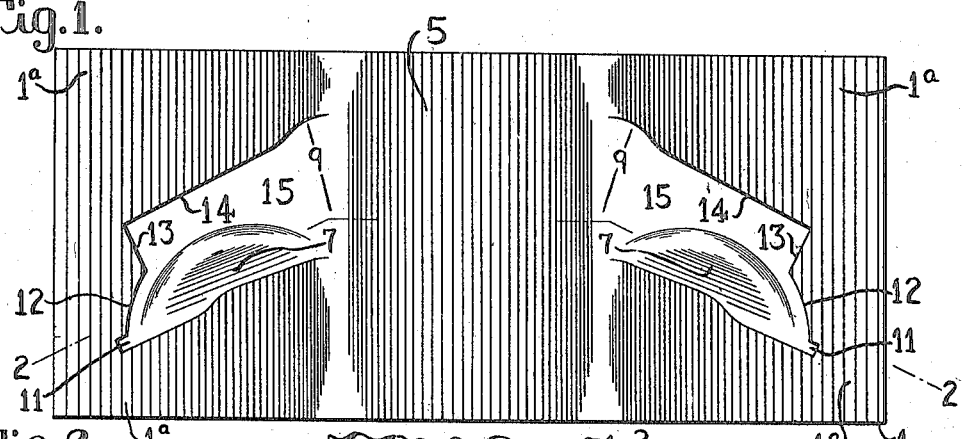
Fig.1.
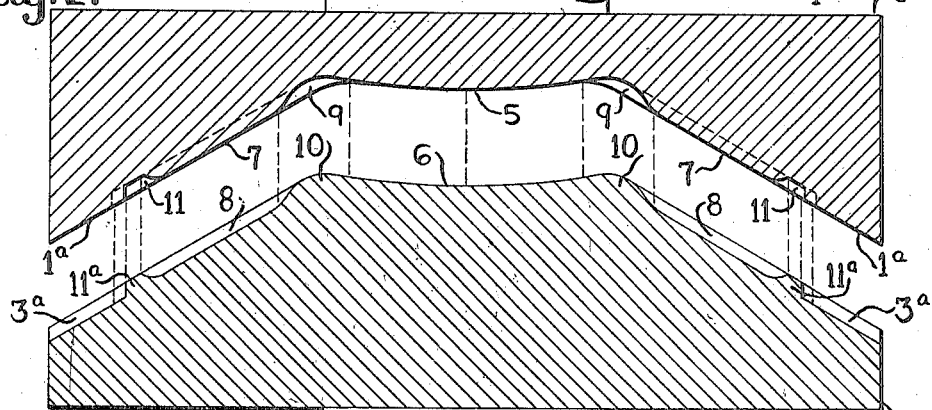
Fig.2.
Fig.3.
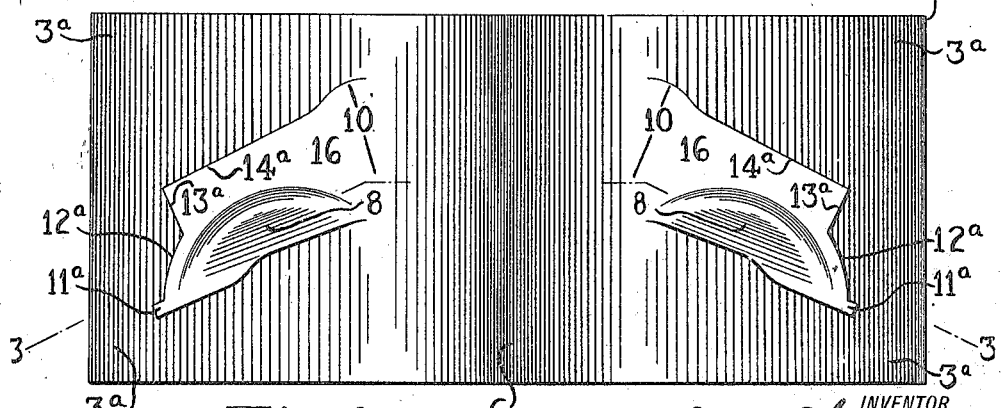
Fig.4.
INVENTOR
Edgar R. Stoddard
BY
Stewart Perry
his ATTORNEYS

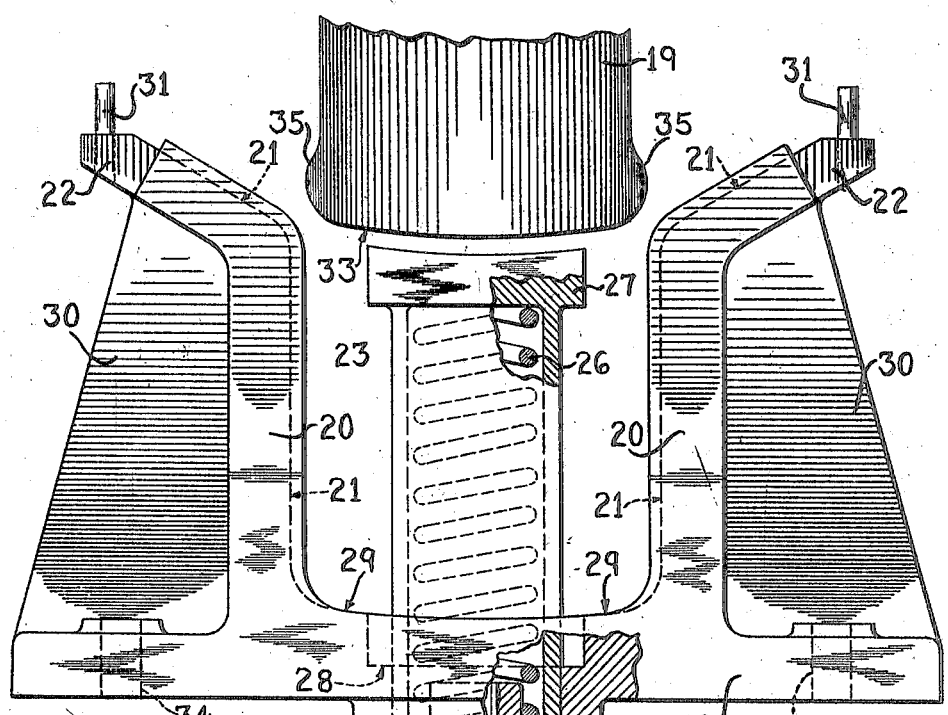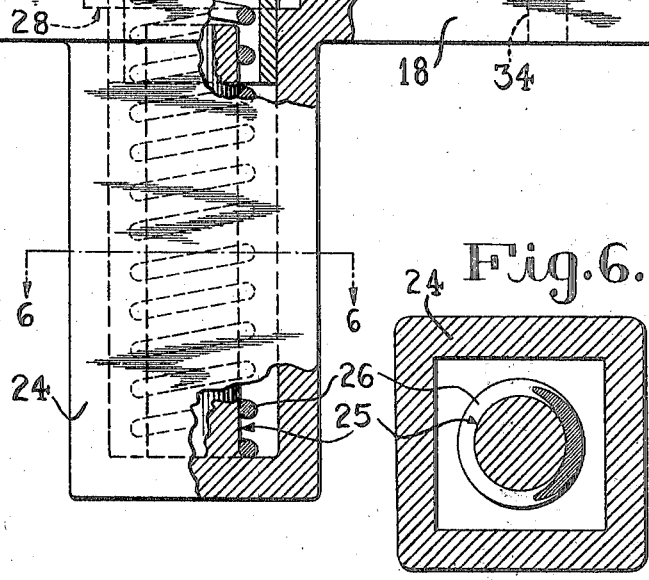

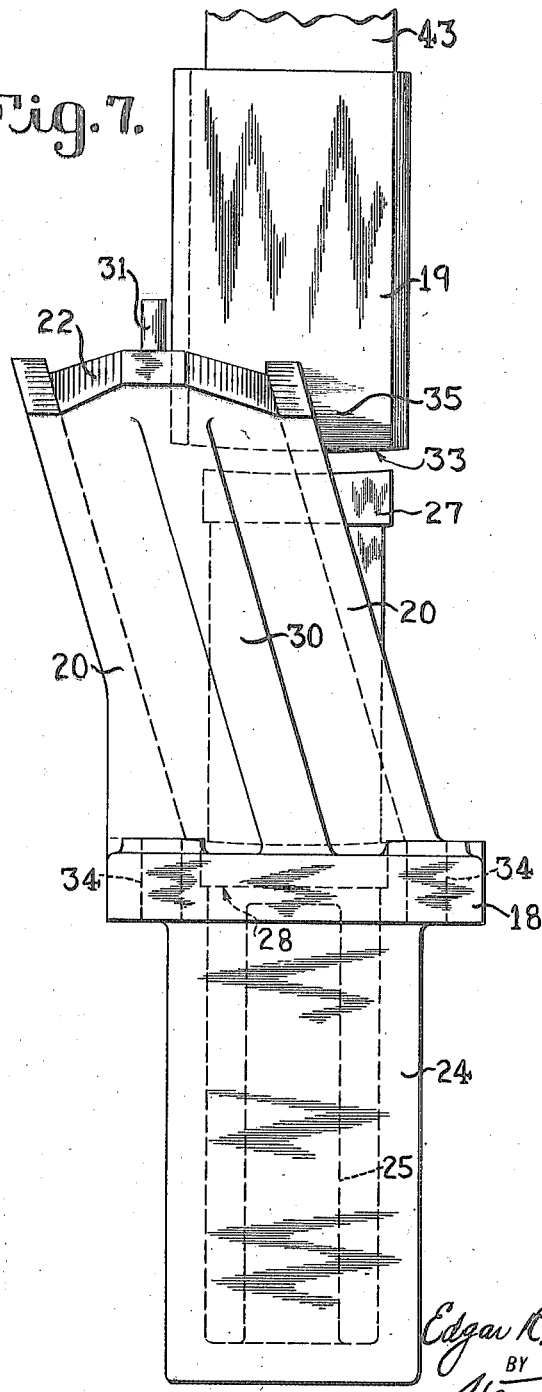

Jan. 23, 1923.                                                              1,442,913.
E. R. STODDARD.
DIE FOR FORMING VEHICLE BODIES.
FILED JUNE 29, 1920.                                    5 SHEETS—SHEET 4.
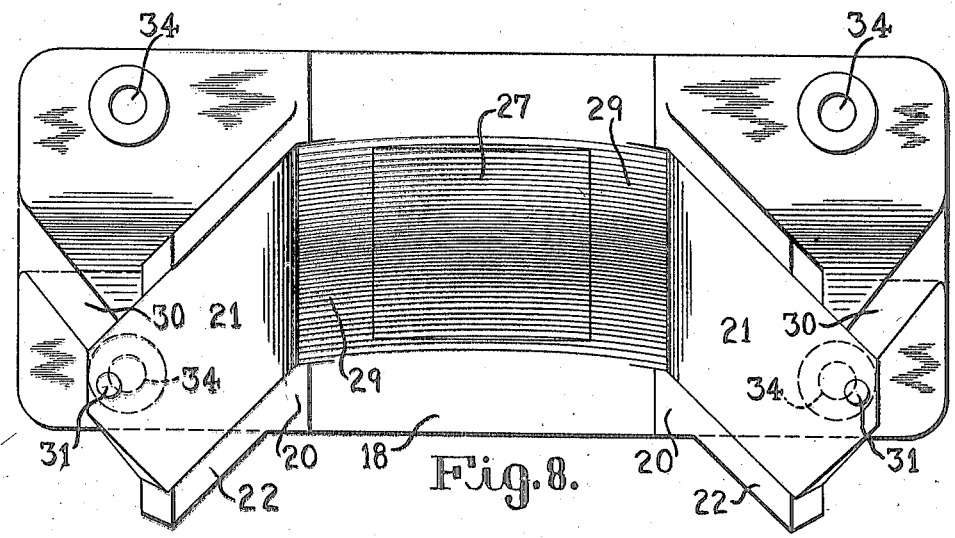
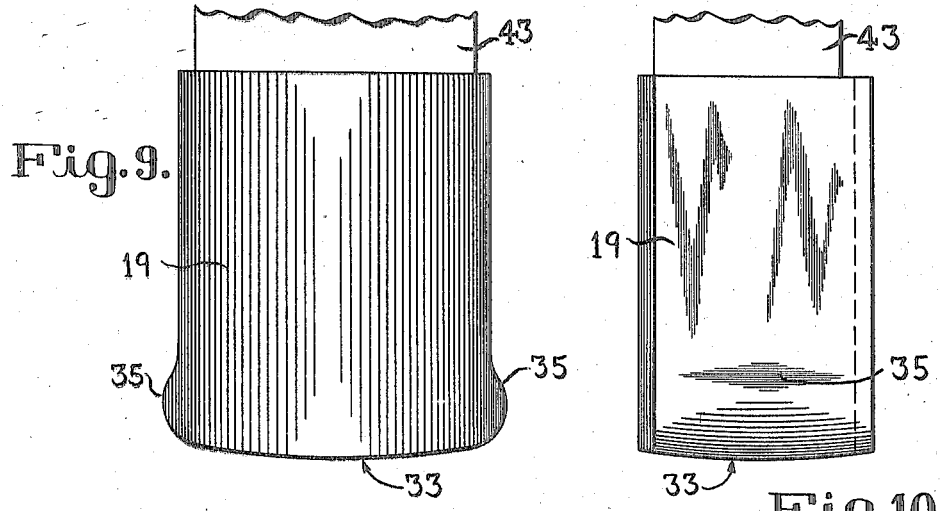
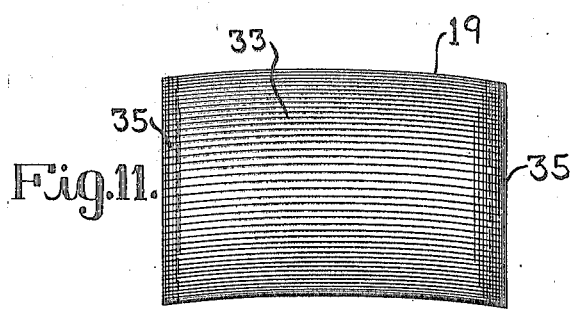
Edgar R. Stoddard, INVENTOR
BY Stewart & Perry
his ATTORNEYS Jan. 23, 1923.
E. R. STODDARD.
DIE FOR FORMING VEHICLE BODIES.
FILED JUNE 29, 1920.
1,442,913.
5 SHEETS—SHEET 5.
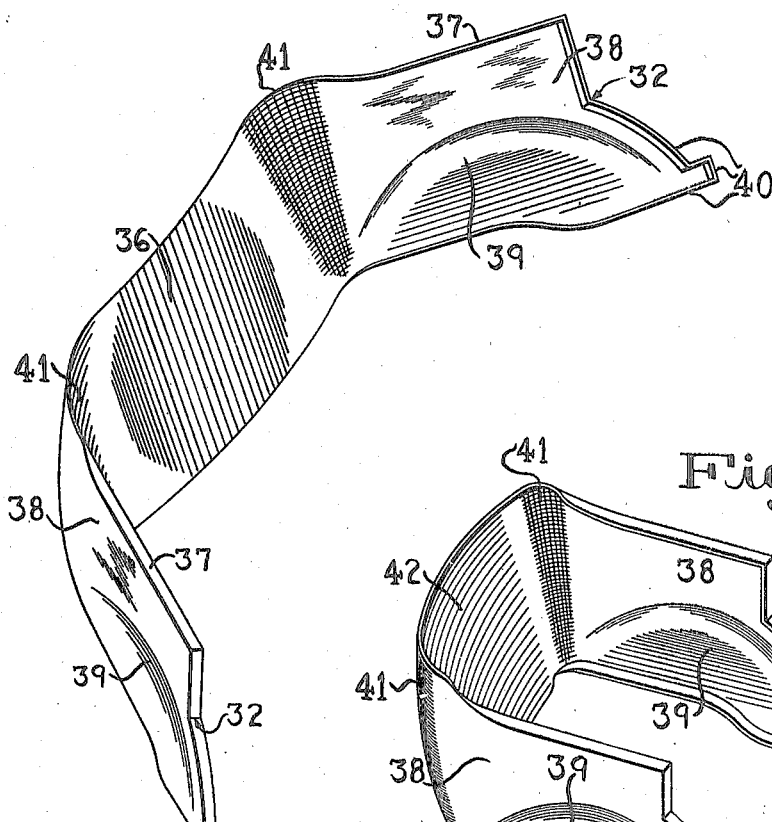
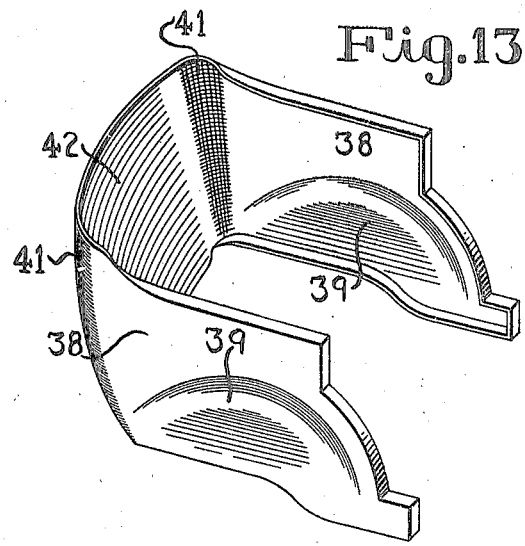
INVENTOR
Edgar R. Stoddard
BY
Steuart Perry
ATTORNEYS Patented Jan. 23, 1923.

1,442,913

UNITED STATES PATENT OFFICE.

EDGAR R. STODDARD, OF SOUTH BEND, INDIANA, ASSIGNOR TO THE STUDEBAKER CORPORATION, A CORPORATION OF NEW JERSEY.

DIE FOR FORMING VEHICLE BODIES.

Application filed June 29, 1920. Serial No. 392,814.

*To all whom it may concern:*

Be it known that EDGAR R. STODDARD, a citizen of the United States of America, and resident of South Bend, in the county of St. Joseph and State of Indiana, has invented certain new and useful Improvements in Dies for Forming Vehicle Bodies, of which the following is a specification.

This invention relates to dies for pressing, stamping and shaping sheet metal articles, and, particularly, relates to dies for producing bodies for automobiles and similar vehicles.

Among the objects of my invention may be noted the following: to provide dies by means of which vehicle bodies may be stamped or pressed out of a single sheet of stiff material in two operations; to provide dies by means of which automobile or other vehicle bodies may be stamped out of a single piece of sheet material; to provide dies with certain facial characteristics adapted to cooperate in the production of automobile or similar vehicle bodies and produce the same with all the necessary structural characteristics quickly, cheaply and with great facility; and to provide a primary set of dies and a secondary set of dies adapted, by their successive operations upon the single sheet of material, to produce in two operations a vehicle body, such as the tonneau of an automobile.

With the above objects in view and others which will be detailed during the course of this description my invention consists in the parts, features, elements and combinations thereof hereinafter described and claimed.

In order that my invention may be clearly understood, I have provided drawings wherein:

Figure 1 is a front elevation of the primary female die embodying my invention;

Figure 2 is a section substantially on the line 2—2 of Figure 4;

Figure 3 is a section substantially on the line 3—3 of Figure 4;

Figure 4 is a front elevation of the primary male die embodying my invention;

Figure 5 is a side elevation of the second set of dies employed, showing details of construction and sections being broken away for better understanding;

Figure 6 is a section on the line 6—6 of Figure 5;

Figure 7 is an end elevation of Figure 5 showing the angle at which the male and female dies cooperate in pressing the partially formed body of Figure 12;

Figure 8 is a top plan view of the female die of Figure 5;

Fig. 9 is a side elevation of the male die of Figure 5;

Figure 10 is an end elevation of Figure 9;

Figure 11 is an elevation of the executive end of the die of Figure 9;

Figure 12 is a perspective view of the body-shape produced by the primary dies of Figures 1 to 4; and Figure 13 is a perspective view of the final product or completed body-shape after being subjected to the operation of the secondary dies of Figures 5 to 11, inclusive.

Referring to the drawings, Figures 1 to 4, the numeral 1 indicates the block or body of the female member of the first set of dies, which is supported in any suitable manner, conventionally shown at 2. The face of the female die has the necessary conformations or characteristic features to produce the body-shape or first product shown in Figure 12. The male member of the die is indicated by 3 and is supported by any suitable means, conventionally shown at 4. Generally speaking, the female die 1 has a central convexed portion indicated by 5, which cooperates with the concaved central portion 6 of the male die. The female die 1 is also provided near its opposite ends with longitudinally curved, outwardly projecting faces 7 adapted to enter correspondingly formed depressions 8 in the face of the male die. At the opposite sides of the convexed portion 5 of the female die are formed the semi-circular grooves 9 which extend substantially from top to bottom of the female die. These grooves are adapted to cooperate with the correspondingly formed projections or protuberances 10 on the face of the male die at the opposite sides of the concavity 6. The female die 1 also has in its face angular grooves indicated generally by 11, which extend from near its opposite ends and bottom inwardly, and then upwardly and inwardly with a curve, as at 12, and then upwardly at an obtuse angle, as at 13, and then inwardly in a straight line at a right-angle, as at 14, to the concavity 9. The male die has corresponding angular projections adapted to cooperate with the grooves 11, 12, 13 and 14, the corresponding, cooperative projecting parts being indicated, respectively, at 11ª, 12ª, 13ª and 14ª. The cooperative features of the dies just described also produce, together with the surface adjacent thereto, the general body-groove 15 in the female die and corresponding projection 16 in the male die above and around the rear portion of the formations 7 and 8, respectively. The remaining portions of the female die 1, beyond the characteristics just described, and composing the normal surface of the die face, are indicated by 1ª, and the male die has its corresponding face portions grooved or depressed, as at 3ª.

An important characteristic or feature of my invention is that the two die members 1 and 3 shall be so constructed that the male member may freely enter and withdraw from the female member by a movement of one or the other in a right-line, and also that the dies shall be so formed that the facial angles of the respective dies shall cooperate in a manner such that the walls, which are at an angle to the faces of the respective dies, shall interact without tearing, cutting, abrading or unduly stretching or distorting the material. This is brought about by having all the like angles and curves, of the facial features of the two dies, lie in substantially the same plane which is parallel with the central transverse axis of the dies and which cuts the vertices of like angles of the respective dies, or cuts the points of juncture of the like straight walls or faces, of the dies, with the curved or angular faces, respectively. This is clearly indicated by the several dotted parallel lines shown extending between Figures 2 and 3. The cooperative action of the male and female dies of Figures 1 to 4, produces the primary product, or body-shape, of Figure 12, which, in this instance of my invention, is an automobile body of the tonneau type having all the necessary characteristics of said bodies except the parallel or substantially parallel, sides and double convex back, or back made to have convex curves in two directions at a right-angle to each other. These final features, shown in Figure 13, are imparted by the cooperative action of the secondary dies of Figures 5 to 11. It should be understood, however, that the primary product of Figure 12 is formed from a blank cut from a sheet or strip of metal, or other suitable material, said cut blank being of predetermined size and having all the predetermined outline characteristics of the vehicle body to be produced.

After the primary product of Figure 12 has been produced, it is subjected to the second set of dies shown in Figures 5 to 11, wherein the base of the female die is indicated by 18 and the male die by 19. The female die is provided with the parallel side members 20 which are grooved longitudinally, as at 21, and are extended into flared or laterally inclined members 22 arranged at an obtuse angle to the side members or walls 20. Thus, the female die is provided with a deep recess 23, adapted to receive the concavo-convex central body portion of the primary product of Figure 12, the flared side portions of said product being primarily set against the inclined extensions 22 of the female die. The base of the female die is provided with a tubular extension 24, having a central post 25 surrounded by a coiled spring 26, resting at one end on the bottom of the extension and supporting at its other end the plunger-head 27 of the female die. The plunger-head is carried by the hollow plunger which works in the extension 24 and surrounds the spring 26. Normally, the spring holds the plunger elevated with its head 27 in the position shown in Figure 5. When the plunger is depressed, compressing the spring 26, the head 27 bottoms on the seat or shoulder 28 of the base 18, and the surrounding surface of the female die is formed in continuity with the surface of the plunger-head 27, as indicated in Figures 5 and 8, at 29, the grooves 21 in the side walls 20 being continued to said surface 29. The side walls 20 and inclined extensions 22 of the female die are braced and strengthened by the webs 30 extending from the base 18; and the extensions 22 are provided on their upper surfaces at their free ends with registering lugs or blocks 31, of a shape adapting them to fit in the angle 32 of body-shape when the latter is laid upon the female die. These lugs 31 facilitate the operator in setting the body-shape in the die and prevent a careless or unskilled operator from making mistakes. Viewing Figures 7 and 8 it will be seen that the side walls 20 of the female die are set at an angle to the vertical plane in which the male die 19 operates, and at a lateral inclination to the base 18. This is for the purpose of enabling the male die 19 to give the proper shape to the final product without distorting, straining or twisting the side body members of the body-shape as the latter is forced into the female die; also to enable the bottom of the female die and surface of the plunger-head 27 and the executive end 33 of the male die to be so located as to produce, at one operation, the double concavo-convex back form on an inclined plane, as shown in Figure 13, and this without straining or twisting the other portions of the body-shape. The base 18 is secured to a suitable support by bolts passing through the holes 34 in the base. The male die 19 at its executive end is formed to cooperate with the bottom of the female die and the surface of the plunger-head 27, and, in addition, is provided with the lateral bulged portions or enlargements 35 which cooperate with the side walls and bottom of the female die. Thus the two sets of dies,—the primary dies of Figures 1 to 4, and the secondary dies of Figures 5 to 11,—produce the respective products of Figures 12 and 13, having the following characteristic features: the inwardly bent back member 36, Figure 12, with outwardly flared side-body members 37, the latter having outwardly bulged body portions generally indicated by 38, and inwardly bulged semi-circular wheel-receiving portions 39, and flanged rim portions 40. At the junction of the back with the side flared portions, outwardly bent or transverse grooved portions 41 are formed. When the body-shape thus produced by the primary dies, is subjected to the action of the secondary dies, the finished product of Figure 13 is given the additional characteristics as follows: The back is given the double concavo-convex form at an inclination from bottom to top, as at 42, and the side-body portions are brought into approximate parallelism. The bulge portions 35 of the male die 19 cooperate with the grooves 41 of the body-shape and prevent the latter from shifting or slipping in the female die when the male die enters the latter. The product of Figure 13 is fitted upon a body-frame and the flanged portions 40 are hammered or beaten over the outline members of the frame to secure the two together. Additional means may also be employed if found necessary. The male die 19 is much narrower transversely than the opening 23 in the female die, thus leaving space sufficient between the side walls of the two dies to admit the side members of the body-shape between the two without crushing or distorting the side members of the body-shape when the latter is subjected to the action and pressure of the said dies. This feature of the male die results in relieving the side members of the primary body-shape from all lateral pressure when it is forced into the space 23 of the female die. The male die 19 is shown as supported by some suitable means, conventionally indicated at 43. As heretofore stated, the spring 26 normally holds the plunger elevated, as shown in Figure 5, and in position to receive the back member of the body-shape. When pressure is applied to the male die 19, its executive end first presses the back of the body-shape outwardly against the plunger-head 27, and continued pressure will cause the female plunger member to descend within the extension 24, compressing said spring 26. After the final pressure upon the male die 19 has been applied to the body-shape, the said die is lifted from the female die and the plunger-head follows the male die 19, the two keeping the body-shape firmly clamped between them until the position of the Figure 5 is resumed. From this it will be seen that the plunger-head has several important functions: it supports the back of the body-shape, overcoming any tendency to sag within the female die when first placed therein; it resists the primary thrust of the male die, enabling the latter at once to bend the back of the body-shape outwardly; it cooperates with the male die in clamping the body-shape, so that the latter can be depressed within the female die without slipping, twisting or shifting as its sides are bent toward each other and its back is carried to the bottom of the female die; and it operates as a stripper for the female die and as an ejector for the body-shape, since it follows, under the expansive pressure of the spring 26, the male die upwardly, still clamping the back of the body-shape, and lifts the body-shape from the female die, thus enabling said body-shape to maintain its form, as finally given in the secondary dies.

From the foregoing description, and with reference to Figures 12 and 13, it will be seen that I have produced two sets of dies adapted to operate upon the same sheet of metal successively, in order to make, of a single piece of sheet metal, a vehicle body such, for example, as the tonneau of an automobile. And the successive operations of the two sets of dies produce all the essential and necessary characteristics of the tonneau body including the wheel grooves 39 in the opposite side members, the convexed back or central portion 42, the concaved body portion 38 of the two side members into which the wooden frame of the tonneau body is set, and the bulged or symmetrically rounded junctions 41 between the side members and back. The general tonneau shape, or any other shape, is given in the first instance, as explained, by cutting out a blank, of desired shape, from a strip of suitable sheet material; and there remains only the final operation, after the two sets of dies have operated upon said blank, of beating down or hammering the edges of the body-shape around the wooden frame of the vehicle body, and suitably fastening said turned in or beaten down edges, as may be found most convenient.

While I have dealt with the characteristic features of the several dies with some particularity, in order to give a correct understanding thereof, I desire it understood that my invention is not restricted to all the characteristics or the particular features set forth, and that many modifications may be made, within the scope of my invention, dependent upon the form of body-shape to be produced and the particular characteristics thereof.

Having thus described my invention, what

I claim and desire to secure by Letters Patent is:

1. In combination, a die couple having interacting central portions respectively convexed and concaved and extending entirely across the dies transversely thereof; said dies having along the opposite margins of said central portions concaved and convexed portions respectively merging into concavo-convexed portions which are elongated and extend toward the ends of said die couple, whereby to produce essential features of a vehicle body including a curved back and side body members having wheel-receiving recesses.

2. A die couple for producing vehicle bodies, each comprising a curved central portion and two end portions arranged at an obtuse angle to the central portion, the central portion extending entirely across the die body and the end portions having concavo-convexed functional surfaces at an angle to the central portion and extending toward the ends of the die, and the latter having its margins surrounding said features plain or devoid of functional features.

3. A die couple for producing vehicle bodies, each of the couple comprising a rectangular member having one surface curved from end to end, said surface being centrally curved transversely of said member and from side to side, the said curved surface being bordered by additional curved surfaces extending only partially across the member and merging into other portions of the surface which are concavo-convex and arranged at an angle to the ends of said member and extending to near said ends.

4. In combination, a die couple rectangular in form and the female member of which is hollowed from end to end, the central portion being deeper than the two wings, and said central portion being convexed in the direction of the length of the member, said die being provided in its hollow surface near its opposite ends with longitudinally curved, outwardly projecting faces merging into semi-circular grooves extending transversely of the member, said hollow surface also having a series of grooves extending from the bottom of the projections around the same to the semi-circular grooves, and the male member being provided with surface features cooperative with those of the female member.

5. In combination, dies for forming vehicle bodies including male and female members having interacting and correspondingly formed characteristic features comprising central curved members, end members the surfaces of which are arranged at an obtuse angle to the central members, said end members each having characteristics adapted to produce in a sheet of metal inwardly curved recesses in which the wheels of the vehicle may run.

6. In combination, dies for forming vehicle bodies comprising male and female members having interacting and correspondingly formed characteristic features comprising central curved members, end members the surfaces of which are arranged at an obtuse angle to the central members, said end members each having characteristics adapted to produce in a sheet of metal outwardly projecting recesses into which the frame of the vehicle body may be set.

7. In combination, dies for forming vehicle bodies comprising male and female members having interacting and correspondingly formed characteristic features comprising central curved members, end members the surfaces of which are arranged at an obtuse angle to the central members, said end members each having characteristics adapted to produce in a sheet of metal wheel recesses and body recesses extending oppositely to each other in the thickness of the metal.

8. In combination, dies for forming vehicle bodies comprising male and female members having interacting and correspondingly formed characteristic features comprising central curved members, end members the surfaces of which are arranged at an obtuse angle to the central members, said end members each having characteristics adapted to produce in a sheet of metal a central member extended into two flared members and having at the junction of said flared members with the central member substantially semi-circular curves extending from near the top to near the bottom of the sheet of metal.

9. A female die for producing a primary product adapted to be converted into a vehicle body, said die having a central convexed portion extending transversely thereof and two end members at an angle thereto, the latter each having beyond the convexed portion a curved projection, and above the latter an angular recess.

10. A male die for producing a primary product adapted to be converted into a vehicle body, said die having a central concaved portion extending transversely thereof, and two end members at an angle thereto, the latter each provided beyond the concaved portion with curved recesses above which is arranged an angular projection.

11. A female die for producing a vehicle body from a partially formed article comprising a hollow body portion having parallel side walls and end extensions at an obtuse angle to said walls, said extensions each having a gage block projecting therefrom adapted to accurately locate the article in the dies.

12. A female die for producing a vehicle body from a partially formed article, comprising a hollow body portion having parallel side walls and end extensions at an obtuse angle to said walls, said side walls being inclined laterally relatively to the base of the die.

13. A female die for producing a vehicle body from a partially formed article, comprising a hollow body portion having parallel side walls, and the latter having end extensions at an angle to the side walls, said extensions being provided with lugs for registering or locating the article placed thereon to be treated.

14. A female die for producing vehicle bodies from a partially formed article having a rectangular base and parallel walls, extending at a right-angle therefrom, a tubular extension extending from said base parallel with the said walls, and a plunger operating within the extension and having a head adapted to seat upon the base at the bottom of the side walls, the surface of the bottom of the base and the surface of the said head being flush with each other when in cooperative relation.

15. A female die for producing a vehicle body from a partially formed article comprising a rectangular, hollow body portion provided with two parallel side walls, each having lateral end extensions, and a plunger adapted to operate between the said walls, a spring adapted to suspend the plunger in elevated position, and means for limiting the inward movement of the plunger.

16. A female die for producing a vehicle body from a partially formed article comprising a rectangular, hollow body portion provided with two parallel side walls and an inner or bottom wall having a concavity curved in two directions at a right-angle to each other, said bottom wall having a central movable portion.

Signed by me, at South Bend, Indiana, this 21st day of May, 1920.

EDGAR R. STODDARD.

Witnesses:
ELIAS W. STRICKLAND,
ALMA RHEAD.